(12) United States Patent
Wood

(10) Patent No.: US 8,317,280 B2
(45) Date of Patent: *Nov. 27, 2012

(54) REFRIGERATOR SEALING LOOPS

(75) Inventor: Ian David Wood, Lowestoft (GB)

(73) Assignee: Applied Design and Engineering Limited, Suffolk (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/035,032

(22) Filed: Feb. 25, 2011

(65) Prior Publication Data

US 2011/0148265 A1   Jun. 23, 2011

Related U.S. Application Data

(63) Continuation of application No. 10/570,809, filed as application No. PCT/GB2004/003659 on Aug. 26, 2004, now Pat. No. 7,914,094.

(30) Foreign Application Priority Data

Sep. 5, 2003 (GB) .................................. 0320858.4

(51) Int. Cl.
*F25D 23/08* (2006.01)
*F16J 15/02* (2006.01)
*A47B 88/04* (2006.01)

(52) U.S. Cl. ......................... 312/402; 312/296

(58) Field of Classification Search .................. 312/296, 312/402, 405; 62/441, 302, 407, 371, 238.6, 62/331; 49/478.1, 475.1; 277/629, 644–648, 277/921

See application file for complete search history.

(56) References Cited

U.S. PATENT DOCUMENTS

| | | | |
|---|---|---|---|
| 1,337,696 A | | 4/1920 | Ewen |
| 2,780,926 A | | 2/1957 | Sharpe |
| 2,855,639 A | * | 10/1958 | Korb ............................. 49/478.1 |
| 3,055,193 A | | 9/1962 | Smith |
| 3,077,644 A | | 2/1963 | Kesling |
| 3,272,580 A | | 9/1966 | Dean et al. |
| 3,826,552 A | * | 7/1974 | Anderson ...................... 312/409 |
| 3,888,557 A | * | 6/1975 | Anderson et al. ............. 312/409 |
| 4,538,380 A | | 9/1985 | Colliander |
| 5,120,118 A | | 6/1992 | Rankin |
| 5,289,657 A | * | 3/1994 | Kiel ............................. 49/478.1 |
| 5,309,680 A | | 5/1994 | Kiel |
| 5,816,080 A | | 10/1998 | Jeziorowski |

(Continued)

FOREIGN PATENT DOCUMENTS

GB   579071   7/1946

(Continued)

*Primary Examiner* — Darnell Jayne
*Assistant Examiner* — Timothy M Ayres
(74) *Attorney, Agent, or Firm* — Stevens & Showalter LLP

(57) ABSTRACT

A storage compartment comprises a container defining an access aperture closable by a closure that can be sealed to the container around the aperture and that can be opened by relative movement between the container and the closure in a lateral direction with respect to the aperture, the container having a first sealing loop around the aperture and the closure having a second sealing loop co-operable by alignment with the first sealing loop to maintain a seal when the closure closes the aperture. The sealing loops are moved into and out of mutual alignment by said relative movement between the container and the closure and at least one of the sealing loops includes magnetic means for attracting the other of the sealing loops to maintain a seal when the sealing loops are mutually aligned.

22 Claims, 10 Drawing Sheets

U.S. PATENT DOCUMENTS

| | | | |
|---|---|---|---|
| 6,189,551 B1 * | 2/2001 | Sargeant et al. | 134/200 |
| 6,464,312 B1 | 10/2002 | Tenhundfeld et al. | |
| 7,114,293 B2 * | 10/2006 | Purlee | 49/470 |
| 7,914,094 B2 | 3/2011 | Wood | |
| 2002/0100648 A1 | 8/2002 | Grupp et al. | |

FOREIGN PATENT DOCUMENTS

| | | | |
|---|---|---|---|
| GB | 581121 | | 10/1946 |
| GB | 602329 | * | 5/1948 |
| GB | 602590 | | 5/1948 |
| JP | 06-265262 | | 9/1994 |
| JP | 11-173748 | | 7/1999 |
| JP | 11-287548 | | 10/1999 |
| JP | 2003-509654 A | | 11/2003 |
| JP | 2004-521306 A | | 7/2004 |
| WO | 0036349 A1 | | 6/2000 |
| WO | 0120237 A1 | | 3/2001 |
| WO | 02073104 A1 | | 9/2002 |
| WO | 02073105 A1 | | 9/2002 |
| WO | 02073107 A1 | | 9/2002 |

* cited by examiner

REFRIGERATOR SEALING LOOPS

CROSS-REFERENCE TO RELATED APPLICATIONS

This application is a continuation of U.S. application Ser. No. 10/570,809, filed Mar. 6, 2006, which is a national stage entry of International Application No. PCT/GB2004/003659, filed Aug. 26, 2004, which claims priority to Great Britain Application No. 0320858.4, filed Sep. 5, 2003.

BACKGROUND OF THE INVENTION

This invention relates to storage and in preferred embodiments relates to the art of cold storage, including appliances such as refrigerators and freezers for storing foodstuffs and other perishables. Other applications of the invention include storage of chemicals and medical or biological specimens. The invention also finds use in mobile applications, for example in the transport and storage of perishable goods. More generally, the invention finds use in any form of storage involving the use of drawers, but particularly where the drawers need to be sealed when closed.

The invention finds particular benefit in the context of the Applicant's multi-compartment cold storage appliances of the general type disclosed in its co-pending patent applications WO 01/020237, WO 02/073104, WO 02/073105 and WO 02/073107, the contents of which are incorporated herein by reference, and develops and adds to certain features of those specifications while omitting or varying other features. As in those specifications, the invention can be applied to storing any items whether within a cooled environment or otherwise. The term 'appliance' is therefore to be construed broadly, extending beyond fixed domestic devices into industrial, scientific and mobile applications. However, this specification will particularly describe domestic or commercial cold-storage appliances for storing foodstuffs.

The compartments of the appliances disclosed in WO 01/020237, WO 02/073104, WO 02/073105 and WO 02/073107 are drawers sealed from one another to minimise cross-contamination, waste of energy and icing. Optionally, there is provision to select different temperatures in different compartments to suit different foodstuffs or other contents, and to suit different cold-storage regimes such as refrigeration marginally above zero Celsius and freezing significantly below zero Celsius. Indeed, it is possible for a given compartment to be converted readily from refrigerator to freezer and back again, thereby to vary the proportion of refrigerator space to freezer space in the appliance as a whole. In this way, the appliance can respond to changing cold-storage needs.

Briefly to recap the introduction of WO 01/020237, the advantages of storing foodstuffs and other perishable items in refrigerated and segregated conditions have long been known: refrigeration retards the degradation of such items and segregation helps to prevent their cross-contamination. Accordingly, modern cold-storage appliances such as refrigerators and freezers are usually compartmentalised, albeit not often effectively, so that a user can store different types of food in different compartments. All such appliances have the additional aim of maximising their energy efficiency.

The invention herein and the inventions in the Applicant's earlier patent applications WO 01/020237, WO 02/073104, WO 02/073105 and WO 02/073107 mentioned above were devised against a background of typical cold-storage appliances, most of which comprise one or more upright cabinets each with a vertically-sealed hinged door on its front. Substantially all of the interior of the cabinet defines a storage volume, most commonly partitioned by shelves or drawers for supporting stored foodstuffs. Access to all of the shelves or drawers in the cabinet is gained by opening the door.

A cooler unit generates a convection loop within the cabinet, in which air cooled by the cooler unit sinks toward the bottom of the cabinet and as that air absorbs heat during its downward journey, it warms and rises back up to the cooler unit where it is cooled again. It is also possible to have forced-air circulation by means of a fan within or communicating with the cabinet. The shelves or drawers are typically made of wire so that they offer little resistance to this circulation of air.

WO 01/020237, WO 02/073104, WO 02/073105 and WO 02/073107 address a major problem with upright refrigerators and freezers, namely the upright door which, when opened, allows cold air to flow freely out of the cabinet to be replaced by warm ambient air flowing in at the top. That rush of ambient air into the cabinet causes its internal temperature to rise, hence consuming more energy in redressing that rise by running the cooler unit. The incoming ambient air introduces the possibility of airborne contamination, and moisture in that air also gives rise to condensation and ice within the cabinet. The more often and frequently the cabinet is opened, as may happen especially in commercial cold storage appliances, the worse these problems get.

In upright-door arrangements, the limitations of the vertical seal mean that loss of cold air and induction of warm air can even occur when the door is closed. Being denser than warmer air, the coldest air collects at the bottom of the cabinet and applies pressure to the sealing interface so that unless the seal forms a perfect seal between the door and the cabinet, that air will escape.

The appliances disclosed in WO 01/020237, WO 02/073104, WO 02/073105 and WO 02/073107 also address the problems inherent in the well-known chest freezer, whose open-topped cabinet is typically closed by a horizontally-hinged upwardly-opening lid. Such a chest freezer is inconvenient and wasteful of space because it precludes use of the space immediately above the freezer, which space must be preserved to allow its lid to be opened. Even if a sliding lid is used instead of an upwardly-opening lid, items cannot be left conveniently on top of the lid. It is also well known that large chest freezers can make access to their contents extremely difficult, it being necessary to stoop down and shift numerous heavy and painfully cold items to get to items at the bottom of the freezer compartment.

Finally, the appliances disclosed in WO 01/020237, WO 02/073104, WO 02/073105 and WO 02/073107 address the problem of segregating different types of foodstuff or other perishable items to avoid cross-contamination. In typical cold-storage appliances, segregation of food is compromised by the convection and/or forced-air principles on which those appliances rely. The substantially open baskets or shelves designed to promote convective circulation of air between the compartments also promote the circulation of moisture, enzymes and harmful bacteria. In addition, any liquid that may spill or leak, such as juices running from uncooked meats, will not be contained by the open baskets or shelves.

Conventional cold-storage appliances exemplified by upright refrigerators and chest freezers are not the only prior art disclosures of interest. For example, it has been known for many years to divide a refrigerator into compartments, each with its own dedicated closure such as a door or lid. Examples of this idea are disclosed in UK Patent Nos. GB 602,590, GB 581,121 and GB 579,071, all to Earle, that describe cabinet-like refrigerators.

In those Earle documents, the front of the cabinet is provided with a plurality of rectangular openings for receiving drawers. Each drawer has a front panel larger than its respective opening so that a vertical seal is formed around the overlap when the drawer is in a closed position. The drawers and their contents are cooled by a cooler unit that circulates cooled air by convection within the cabinet, in common with the types of refrigerator already described. To promote circulation of this air amongst all of the drawers, the drawers are open-topped and have apertures in their bottoms. Also, the drawers are disposed in a stepped arrangement, those at the top of the refrigerator extending back less far into the cabinet than the lower drawers so that the rear of each drawer is exposed to the downward flow of cooled air from the cooler unit.

Although only one drawer need be opened at a time, the apertures in the bottom allow cold air to flow freely from the open drawer, which is replaced by warm moist ambient air to the detriment of energy efficiency and with the increased possibility of cross-contamination. Indeed, when a drawer is opened, cold air within the cabinet above the level of that drawer will flood out, drawing ambient air into the cabinet. Furthermore, the drawers encourage ambient air to flow into the interior of the refrigerator because, upon opening, they act as pistons drawing the ambient air into the interior of the refrigerator cabinet. Once in the cabinet, the warm air can circulate as freely as the cold air that is supposed to be there.

Even when closed, the accumulation of cold air towards the bottom of the cabinet will exert increased pressure on the vertical seals of the lowest drawers, increasing the likelihood of leakage if the seal is faulty.

A further example of the above type of refrigerator is disclosed in UK Patent No. GB 602,329, also to Earle. The refrigerator disclosed therein suffers many of the above problems but is of greater interest in that a single drawer consisting of insulated sides and base is provided within the cooled interior of the cabinet. In contrast to the variants outlined above, the sides and base are solid and not perforated so that air cannot flow through them. When the drawer is closed, a horizontal member within the cabinet combines with the drawer to define a compartment, the horizontal member thus being a closure in the form of a lid for the drawer. This compartment is provided with its own cooling coils situated just below the horizontal member.

Very little detail is given about the seal that is formed between the drawer and the horizontal member, other than that the horizontal member has a downwardly projecting rear end with a biased edge that makes a close fit with the rear wall of the drawer. Nothing else is said about the junction between the drawer and the horizontal member, apart from the general statement that the drawer is adapted when in its closed position to fit 'fairly snugly' against the horizontal member. It can only be inferred that the drawer and the horizontal member merely abut against each other. Whilst this will impede the passage of air into and out of the drawer, it will not form an impervious seal. As this is not a vapour seal, icing and cross-contamination is likely to occur even when the drawer is closed.

The drawer arrangement described creates a compartment in which a different temperature can be set when compared to the essentially common temperature of the rest of the refrigerator. It is particularly envisaged that the drawer can act as a freezer compartment. The Applicant has appreciated a disadvantage in this arrangement, namely that as the freezer drawer resides within the cooled interior when closed, the outer surfaces of the drawer within the cabinet will be cooled to the temperature of the refrigerator. Accordingly, when the drawer is opened, those cooled outer surfaces will be exposed to ambient air containing moisture that will condense on the cooled surfaces leading to an undesirable accumulation of moisture. Condensation involves transfer of latent heat from water vapour to the drawer, thus increasing the burden of cooling the drawer again when the drawer is returned to the closed position within the cabinet.

Additionally, condensed moisture will be transferred to the interior of the refrigerator when the drawer is closed. As discussed above, the presence of water promotes microbial activity. A further disadvantage of introducing water into the interior of the refrigerator is that it may freeze: this can be a particular problem where the drawer of the enclosed compartment meets the insulated top, as any ice formation will form a seal that locks the drawer in a permanently closed position. This disadvantage was appreciated by Earle, as a cam mechanism is mentioned in GB 602,329 to break any ice formed at the seals or on the runners or other support surfaces of the drawers. It is also possible for a build-up of ice to affect the sealing ability of the seal, by preventing mating sealing surfaces from mating correctly. Of course, the accumulation of ice on moving parts of the drawer mechanism is also undesirable as it will impede movement of the drawer.

A further interesting prior art document, cited as technological background against WO 01/020237, is U.S. Pat. No. 1,337,696 to Ewen. Ewen speaks of segregation between refrigerated drawers contained in a surrounding cabinet and employs refrigerating units placed 'immediately and closely above each drawer . . . so that said drawer may in effect be said to be closed against said refrigerating unit'. However, there has to be a gap left between the drawer and the refrigerating unit if the drawer is going to open. As in Earle, that gap will promote icing as moist air within the cabinet migrates into the drawer and the water vapour condenses and freezes. The smaller the gap, the sooner the accumulating ice will prevent drawer movement. If a larger gap is tried instead, there will be a greater spillage of air and hence the refrigerator will be less energy-efficient and more susceptible to cross-contamination.

That aside, the spillage of cold air in Ewen lowers the temperature within the cabinet around the drawers, and so increases the likelihood of condensation on the drawers when opened. It will be noted that cold air spilled in this way can fall freely behind the drawers within the cabinet and so expose the exterior of the drawers to air substantially below ambient temperature. Certain design details of Ewen worsen this effect. For example, the bottom wall of the Ewen unit is an efficient insulator which will significantly reduce the surface temperature of the drawers. Also, the internal divisions between the drawers do not allow for ambient heat transfer to the drawers but only for heat transfer between the drawers, thus promoting drawer-to-drawer temperature equalisation over time. Left for long periods, or even overnight, large parts of the external surface of each drawer will fall to temperatures significantly below ambient dew point. Condensation or ice will therefore form on those surfaces as soon as the drawers are opened; similarly, if the drawers are removed and left outside the appliance, they will start to 'sweat' with condensation.

Like Earle, opening and closing a drawer within a sealed cabinet in Ewen acts like a piston, alternately applying both negative and positive pressures to adjacent areas. This promotes air transfer through the drawer opening at the front of the cabinet, which can displace cold treated air in a drawer, and within the cabinet itself. An over-sized cabinet would reduce the piston effect but would also be wasteful of space. Conversely, a more space-efficient close-fitting cabinet may decrease the displacement of cold treated air, and so reduce the burden of cooling the warmer air that takes its place, but it will increase resistance to opening and closing the drawer.

Cold air spillage aside, the gap inevitably left between a drawer and its associated lid in prior art arrangements is large enough to allow the passage of enzymes, spores and other airborne contaminants. Also, Ewen discloses a common interconnecting drain and this too would allow free transfer of contaminants between each drawer, particularly under the aforementioned piston action.

Whilst Ewen speaks of different temperatures in different drawers, the plurality of cooling lids are connected in series and have no means for individual temperature control in each drawer. The different temperatures are designed-in by providing some drawers with more cooling elements than others, but there is no measurement or control of those temperatures in use. Also, like the compartments of more conventional prior art, each drawer in Ewen has a fixed function, namely freezer or refrigerator.

It will be apparent from the foregoing that effective sealing is a prerequisite of efficient cold storage whether in appliances having a vertical seal, exemplified by upright-door refrigerators or freezers, or in appliances having a horizontal seal, exemplified by refrigerators or freezers such as a chest freezer.

Traditionally in the refrigeration art, sealing has been achieved by magnetic seals in which, typically, magnetic strips associated with seals around the periphery of an access aperture attract resilient seal parts into mutual sealing contact when the door, lid or other closure of the cold-storage compartment is closed. The seals can be thought of as co-operable sealing loops extending around the aperture and in a corresponding shape and position on the closure, so that the loops come together and align when the closure is closed. Commonly, one sealing loop is a resiliently flexible seal and the other sealing loop is an inflexible sealing surface against which the resiliently flexible seal seats when the door, lid or other closure is closed. However, it is possible for both sealing loops or indeed neither of them to be resiliently flexible seals. It is also possible for both sealing loops to have associated magnetic means or for just one of the sealing loops to have a magnetic means and for the other to include material capable of attraction to a magnet, such as a steel strip extending around the loop.

It is well known that existing magnetic seals are designed to be pushed together and pulled apart, which characteristic is not appropriate for sealing to a lid around the upper periphery of a drawer. It will be apparent that in the case of a drawer, the opening and closing movement of the drawer will involve relative sliding or wiping movement between at least part of the sealing loops. This is because the lid and the upper periphery of the drawer remain in their original planes, albeit subject to relative translation within those planes, as opposed to experiencing angular movement out of their planes which occurs when a traditional lid or door is hinged open. Typical resilient magnetic seals would be expected to deform and wear unacceptably if used in such circumstances, and to present excessive frictional resistance to movement of the drawer.

The Applicant's initial thoughts were that resilient magnetic seals would be inappropriate for use with drawer-type appliances of the general type disclosed in WO 01/020237, WO 02/073104, WO 02/073105 and WO 02/073107, and in the Earle and Ewen prior art mentioned above. Indeed, the Applicant's objective was to avoid or minimise relative sliding or wiping movement between seal parts whether magnetic or otherwise. Thus, WO 01/020237 and WO 02/073104 propose alternative seal arrangements involving a minor (typically vertical) component of movement of a drawer to separate the drawer from a fixed lid, hence pulling the sealing loops apart, and a major (typically horizontal) component of movement of the drawer to open the drawer fully for access to its contents. When the drawer is being closed, the major component of movement is followed by the minor component to press the sealing loops back together. This two-component movement avoids or minimises relative sliding or wiping movement between parts of the sealing loops.

Whilst the idea of two-component movement of a drawer has proved to be highly effective, the Applicant has continued to explore alternatives. This effort has been particularly focused upon the appliances disclosed in the Applicant's earlier patent applications WO 01/020237, WO 02/073104, WO 02/073105 and WO 02/073107, in which much of the exterior of the drawers and hence the outside of the drawer/lid interface may be exposed to air at or above ambient temperature. As a result, the Applicant has found that sliding magnetic seals can work successfully in a drawer-type environment and especially in the environments disclosed in the Applicant's abovementioned earlier patent applications.

BRIEF SUMMARY OF THE INVENTION

Thus, in a broad sense, the invention contemplates a storage compartment comprising a container defining an access aperture closable by a closure that can be sealed to the container around the aperture and that can be opened by relative movement between the container and the closure in a lateral direction with respect to the aperture, the container having a first sealing loop around the aperture and the closure having a second sealing loop co-operable by alignment with the first sealing loop to maintain a seal when the closure closes the aperture, wherein the sealing loops are moved into and out of mutual alignment by said relative movement between the container and the closure and wherein at least one of the sealing loops includes magnetic means for attracting the other of the sealing loops to maintain a seal when the sealing loops are mutually aligned.

The reference to relative movement in a lateral direction with respect to the aperture is intended to encompass sideways relative movement with the effect of translation of the closure across the aperture from one side of the aperture to another.

In the embodiment to be described, the relative movement between the container and the closure causes sliding contact between the sealing loops. To this end, the sealing loops are preferably substantially planar although a minor portion of a sealing loop may be out of the plane of the remainder of the loop, such as being chamfered for clearance. The sealing loops can move in substantially parallel planes and indeed may be substantially coplanar.

In preferred embodiments, the sealing loops comprise sections transverse to the direction of movement and sections aligned with the direction of movement. Those sections may be substantially straight, as is the case where the sealing loops are generally rectangular and define front and rear sections and two side sections connected successively by corners.

The sealing loops are preferably continuous and both sealing loops may include magnetic means, or one of the sealing loops may include magnetic means and the other of the sealing loops may include material that can be attracted to the magnetic means.

It is preferred that at least one of the sealing loops comprises a resiliently flexible seal. In that case, the seal is suitably an elongate member defining generally parallel ridges separated by a web wherein the ridges maintain clearance between the web and a cooperating sealing surface in use. More preferably, a magnetic or magnetically attractive strip extends along the web to press the ridges into sealing contact with the cooperating sealing surface in use.

Where a resiliently flexible seal includes means for magnetic attraction to the other sealing loop, the seal may be arranged to bias those means away from the other sealing loop. The bias may then be overcome in use by increasing magnetic attraction to effect a seal: for example, alignment of the sealing loops may increase magnetic attraction to overcome the bias and effect a seal in use.

A trace heater may be associated with at least one of the sealing loops to reduce condensation and icing. Where at least one of the sealing loops comprises a resiliently flexible seal, the trace heater may apply heat directly to that seal. For example, the trace heater may be within the seal. The heating effect may be localised: advantageously, the trace heater applies heat to an outboard side of the seal.

For ease of maintenance and repair where at least one of the sealing loops comprises a resiliently flexible seal, the seal is preferably mounted to a removable relatively rigid frame that can be fixed to the container or to the closure.

An insulating barrier is advantageously provided inboard of at least one of the sealing loops. That barrier is suitably configured to maintain substantially all of the associated sealing loop above zero Celsius when the container is used for frozen storage. This avoids icing of the sealing loop.

Where the sealing loops are rectangular, it is preferred that the container or the closure are substantially rectangular but have rounded bulbous corners so that the sealing loops can be situated in an outboard position with respect to the container or the closure. This maximises exposure of the sealing loops to ambient air flow, reducing the risk of condensation and icing.

The invention also encompasses a resiliently flexible elongate seal defining generally parallel ridges separated by a web, wherein a magnetic or magnetically attractive strip extends along the web to press the ridges into sealing contact with the cooperating sealing surface in use, whereupon the ridges maintain clearance between the web and the sealing surface. This arrangement minimises friction during sliding movement but maintains a good seal.

Aspects of the invention relate to an appliance which is preferably a cold-storage appliance but may be a cooking appliance or a washing or drying appliance. The appliance includes at least one container and a structure defining a compartment from which the container can be withdrawn to open the container for access to the interior of the container and to which the container can be returned to close the container, wherein the compartment includes first and second openings through which the container can be withdrawn from the compartment in mutually transverse directions. Expressed another way, the invention provides an appliance including at least one container and a structure defining a compartment from which the container can be withdrawn to open the container for access to the interior of the container and to which the container can be returned to close the container, wherein the compartment includes at least one opening through which the container can be withdrawn by turning the container about a support such as a pivot associated with the structure.

The container preferably closes the or each opening when the container is within the compartment, and may be part-circular in plan, for example a quadrant shape. The walls of the container suitably define radii centred on a vertical pivot axis, which walls are preferably mutually perpendicular.

The pivot axis is advantageously vertical and is preferably adjacent the or each opening. Where there are first and second openings, the pivot axis is suitably between the openings so that the container can pivot through either opening. For example, the compartment may be rectangular in plan with the pivot axis at or near a corner of the rectangle. In any event, the pivot axis is suitably within the compartment or on a boundary of the compartment.

BRIEF DESCRIPTION OF THE SEVERAL VIEWS OF THE DRAWINGS

In order that the invention may be more readily understood, reference will now be made by way of example to the accompanying drawings in which.

DETAILED DESCRIPTION OF THE INVENTION

Figure 1A:
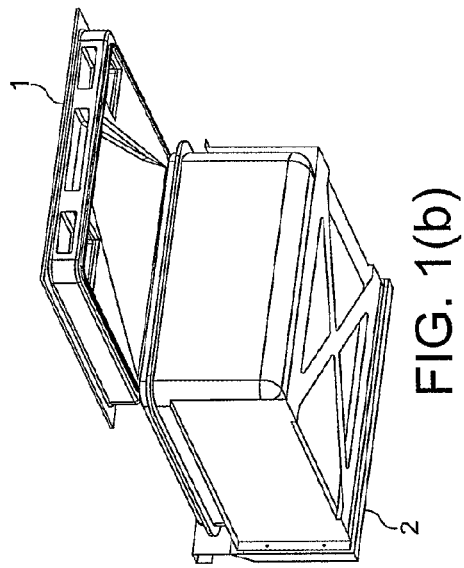
FIGS. 1(a), 1(b), 1(c) and 1(d) are perspective views from underneath showing a fixed lid and a movable drawer in four different positions relative to the lid.
Figure 1B:
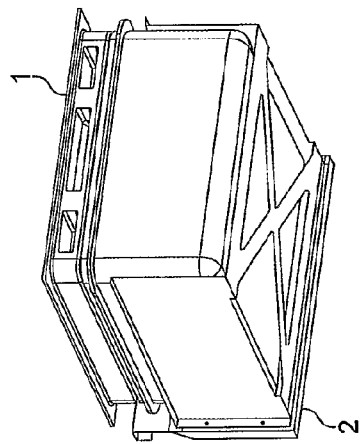
Figure 1C:
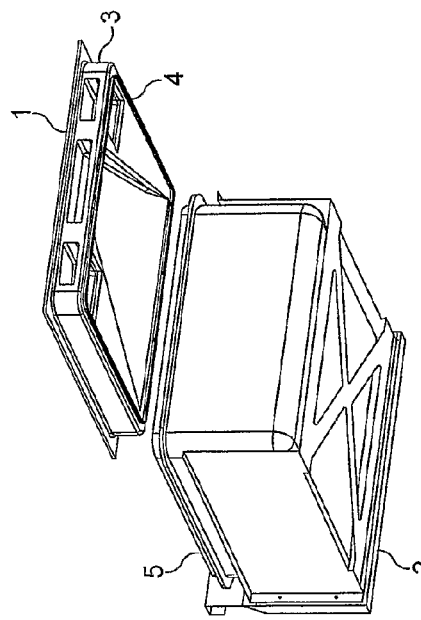
Figure 1D:
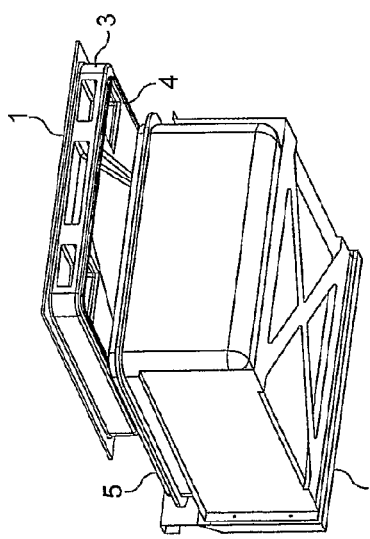

Referring firstly to FIGS. 1(a), 1(b), 1(c) and 1(d) of the drawings, a drawer storage appliance such as a refrigerator comprises a closure being a fixed generally horizontal lid 1 and a container being an open-topped drawer 2 that is movable horizontally with respect to the lid. In practice there will usually be more than one such combination of lid and drawer to make a multi-compartment appliance. The drawer 2 is movable over a range of movement extending from being clear of the lid 1 in a fully open position, as shown in FIG. 1(*a*), in which position the interior of the drawer 2 can be freely accessed for the purpose of loading and unloading, to being closed by the lid 1 in a fully closed position, as shown in FIG. 1(*d*).

A skirt 3 depends from the lid 1 to support a first sealing loop 4 being a continuous peripheral downwardly-facing lid seal. The skirt 3 and the lid seal 4 are shaped to correspond to and cooperate with a second sealing loop 5 being a continuous upwardly-facing sealing surface around the upper peripheral rim defined by generally vertical walls of the drawer 2. The lid seal 4 is resiliently flexible and the sealing surface 5 is relatively stiff such that deflection upon sealing contact between the sealing loops is confined substantially to the lid seal 4.

It is of course possible to reverse the arrangement by having a lid slide relative to a fixed drawer and for an analogous seal arrangement to be used in that event.

It will be apparent that both the lid seal 4 and the sealing surface 5 are continuous loops although those loops could have minor interruptions or discontinuities without necessarily departing from the invention. Moreover, the lid seal 4 and the sealing surface 5 are generally planar, apart from minor chamfering as explained below, and their planes are substantially parallel, indeed practically coplanar, and substantially horizontal. As the drawer 2 moves horizontally, the sealing surface 5 remains in its plane as the drawer 2 moves in use. It follows that the sealing loops move past each other as the drawer 2 is being opened and closed in use, with sliding contact.

In the preferred embodiment shown, the sealing loops defining both the lid seal 4 and the sealing surface 5 are generally rectangular, each defining two parallel straight sections transverse to (indeed orthogonal to) the direction of drawer movement and two parallel straight sections substantially aligned with (indeed parallel to) the direction of drawer movement. Successive sections of the sealing loops are joined by curved corners. Having regard to the direction of drawer movement and the orientation of the drawer 2, the two parallel sections transverse to the direction of drawer movement are referred to herein as a front section and a rear section and the two parallel sections substantially aligned with the direction of drawer movement are referred to herein as respective side sections. Consequently the lid seal 4 and the sealing surface 5 each have a front section, a rear section and two side sections, these sections of the lid seal mirroring their counterpart sections of the sealing surface.

When the drawer 2 is in the fully open position shown in FIG. 1(*a*), there is no alignment between any sections of the lid seal 4 and the sealing surface 5 and hence no significant magnetic attraction between those sealing loops. Upon being partially closed as shown in FIG. 1(*b*), the rear section of the sealing surface 5 of the drawer aligns with the front section of the lid seal 4. There is magnetic attraction between the parts of the sealing loops that are aligned at these locations but the upper rear edge of the drawer 2 is chamfered downwardly (not shown) to maintain clearance underneath the lid seal 4 and hence to avoid snagging the lid seal 4 as the rear of the drawer passes the front section of the lid seal 4.

Further closing movement brings the drawer 2 to the intermediate position shown in FIG. 1(*c*) where there is alignment between rearward portions of the side sections of the sealing surface 5, and corresponding forward portions of the side sections of the lid seal 4. However, there is no alignment involving the front and rear sections of the sealing surface 5 or of the lid seal 4. Consequently, there is magnetic attraction involving increasing portions of the side sections as the drawer 2 is closed, but the front and rear sections of the sealing surface 5 and of the lid seal 4 contribute no magnetic attraction until the drawer 2 is nearly fully closed as shown in FIG. 1(*d*) and those sections come into mutual alignment as the sealing loops align fully with each other.

Whilst side sections of the lid seal 4 are in sliding contact with side sections of the sealing surface 5 at the aligned locations, the area of contact is small and presents little hindrance to continued closing movement of the drawer 2. It is to be noted in this respect that magnetic seals present substantially less resistance to sliding movement parallel to or within the plane of the seal interface surfaces than they do to being pulled apart transversely or orthogonally to that plane. Tests indicate that the resistance to sliding is typically about one-third of the resistance to being pulled apart. It is also to be noted that the parts of the sealing loops that experience most of the sliding contact, namely the side sections, are best oriented to retain their structural stability under frictional forces which align with the direction of drawer movement and hence with the direction in which the side sections extend. This is particularly useful in maintaining the integrity of the flexible lid seal 4 in use.

Tests of the rectangular sealing loop arrangement shown in FIGS. 1(*a*) to 1(*d*) suggest that upon drawer opening, the corners linking successive sections of the lid seal 4 are first to release. This helps, in effect, to peel the neighbouring sections of the lid seal 4 progressively away from the sealing surface 5 of the drawer. This peeling action further reduces distress to the lid seal 4 and the effort of drawer opening but without prejudicing the sealing integrity of the seal when the drawer 2 is closed.

In summary, then, the aggregate magnetic attraction between the sealing loops peaks when the sealing loops are fully aligned, as occurs when a drawer is fully closed with respect to a fixed lid or vice versa. When the sealing loops are not fully aligned, which is the case throughout substantially all of the range of movement of the drawer or lid other than when fully closed, the aggregate magnetic attraction between them decreases markedly.

Figure 2:
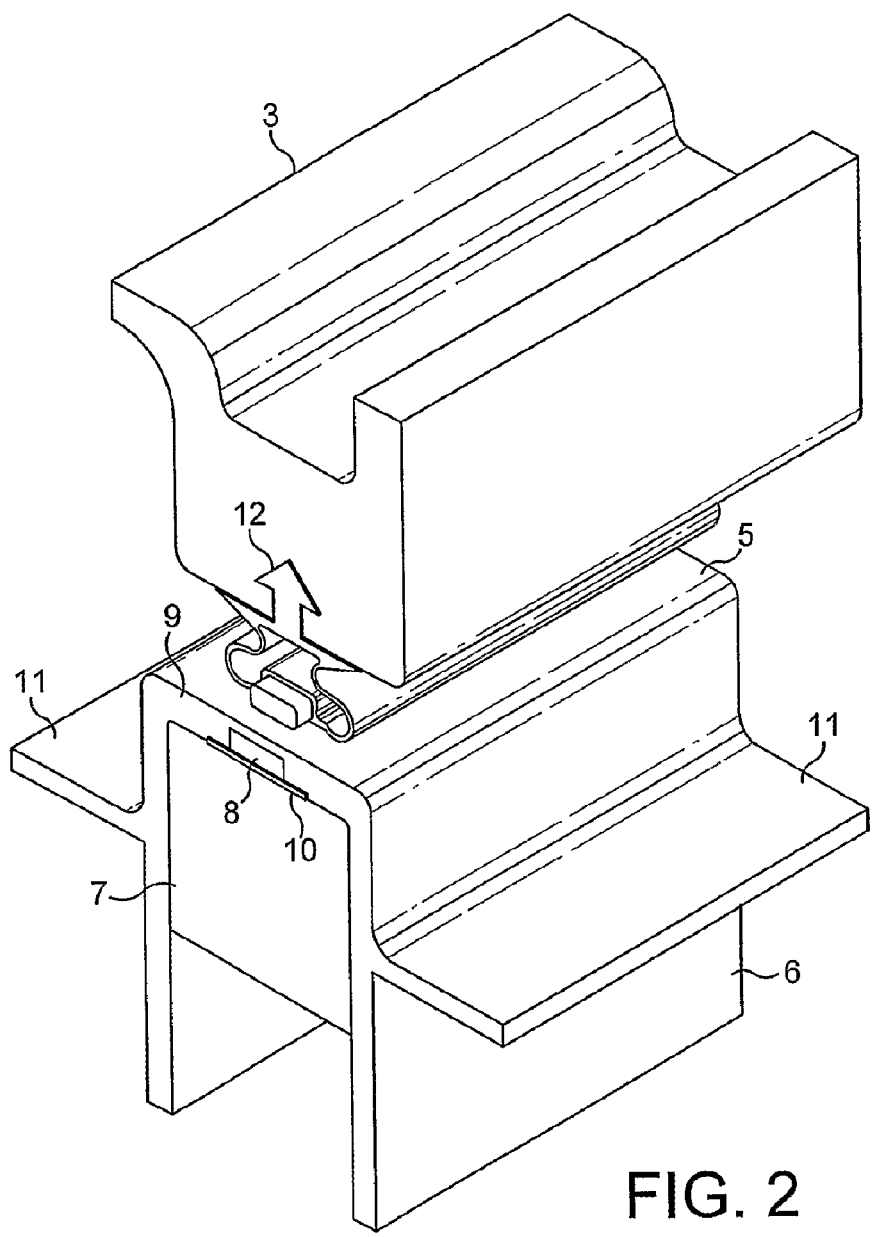
FIG. 2 is a sectional perspective view through opposed seal parts of the lid and drawer shown in FIGS. 1(a), 1(b), 1(c) and 1(d)
Figure 3:
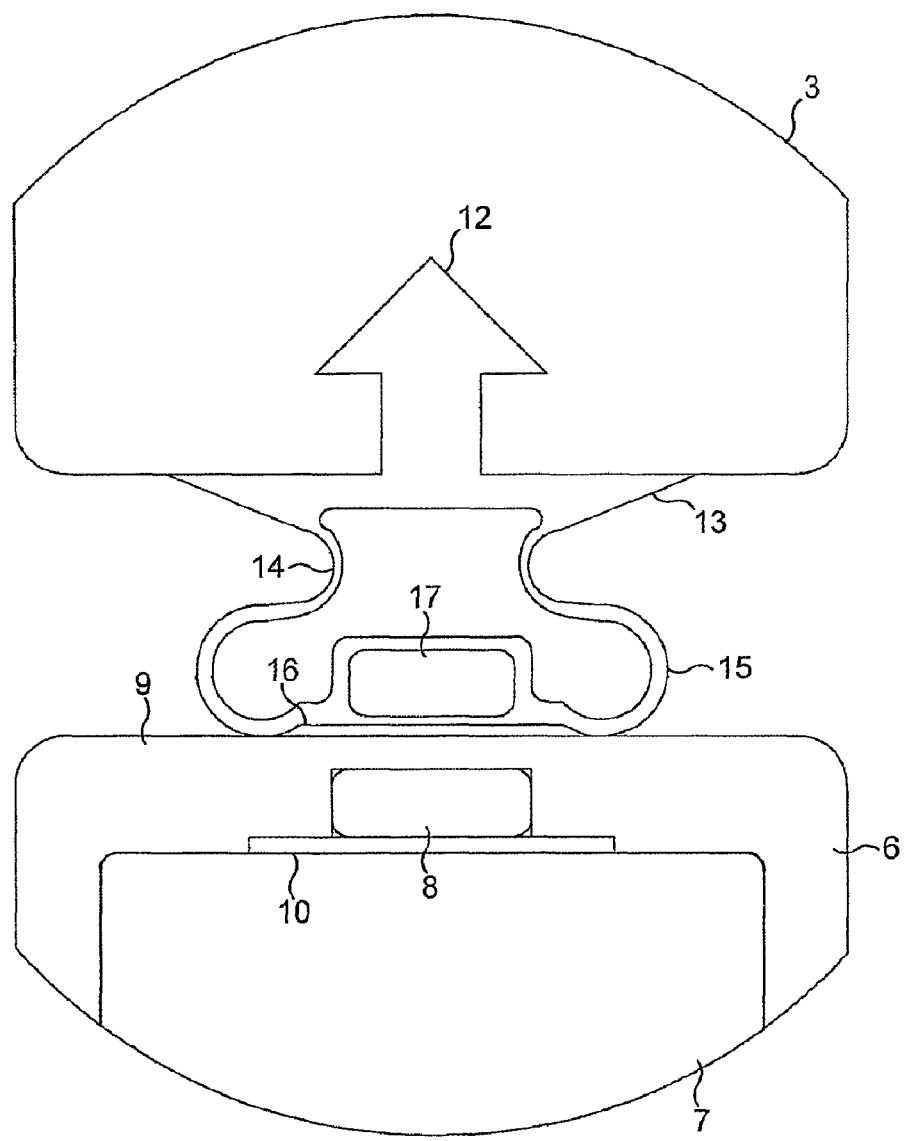
FIG. 3 is an enlarged sectional end view of the seal parts shown in FIG. 2.

Turning now to FIGS. 2 and 3 of the drawings, these show the lid seal 4, the opposed sealing surface 5 and the surrounding lid and drawer structures in detail.

The skirt 3 depending from the lid 1 is a U-section channel whose flat bottom surface carries a central elongate groove undercut to form an enlarged elongate recess of triangular section symmetrical about the central longitudinal plane of the groove. The lid 1 and its skirt 3 are substantially solid but of insulating material.

The opposed sealing surface 5 of the drawer 2 is a flat top surface of a generally vertical wall 6 of the drawer 2, which wall is hollow and filled with insulation 7. An oblong-section magnetic strip 8 extends centrally along the top 9 of the wall, in the top of an inverted T-section groove on the under-surface of the top wall 9 within the hollow cross section, such that the strip 8 is concealed under the top surface of the wall 9. An elongate anti-magnetic flux plate 10 of carbon steel extends along the bottom of the inverted T-section groove, beneath the magnetic strip 8, where it retains the strip 8 in the top of the T-section and is supported by the insulation 7 filling the hollow cross-section of the wall 6. The anti-magnetic flux plate 10 is provided with surface protection to resist corrosion.

It will be seen from FIGS. 2 and 3 that flanges 11 extend outwardly to both sides of the wall of the drawer, but these flanges 11 are for support purposes not related to the present invention.

The lid seal 4 shown in FIGS. 2 and 3 is a flexible resilient strip, suitably extruded or moulded, that is symmetrical about its central longitudinal plane. Looking from top down as illustrated, the seal comprises an anchor portion 12 of arrowhead cross-section shaped to be snap-fitted into the undercut groove in the bottom face of the skirt 3. Beneath that, tapering flanges 13 extend laterally from the base of the arrowhead anchor portion 12 to bear resiliently against the bottom face of the skirt 3 and so to hold the seal 4 stably against the skirt 3. Beneath the flanges 13, the strip is of hollow cross section and comprises a narrow waist portion 14 extending inwardly below the flanges above a flared base portion. The base portion has rounded lobes 15 that curve outwardly and downwardly from the waist portion 14 and then inwardly and slightly upwardly, towards each other, to support a central generally flat web 16. Consequently, the web 16 is slightly above and between a pair of rounded sealing ridges defined by the lobes 15, which ridges together define the lowest level of the lid seal 4 and hence the sealing interface with the opposed sealing surface of the drawer 2.

The flat web 16 of the lid seal contains a channel running the length of the seal that holds a further magnetic strip 17 within the hollow cross-section of the seal 4. In use, this strip 17 is attracted to the magnetic strip 8 associated with the sealing surface of the drawer 2, to pull the flexible lid seal 4 into sealing engagement with the sealing surface 5. The purpose of the anti-magnetic flux plate 10 is to prevent or reduce like-pole repulsion between the magnetic strips, hence reducing seal distortion and assisting seal alignment in use. Of course, it would also be possible for only one of the strips to be magnetic and for the other to be of a material, particularly ferrous material, that attracts or is attracted to the sole magnetic strip.

It will be apparent from the enlarged cross-sectional view of FIG. 3 that as the lobes 15 to either side of the central web 16 of the lid seal can hold that web clear of the sealing surface 5 of the lid, contact with the sealing surface 5 is restricted to two parallel lines of contact, one under each lobe 15 of the lid seal 4. Consequently, there is minimal frictional resistance to relative sliding movement between the lid seal 4 and the drawer 2. However, the efficacy of sealing is maintained because the magnetic attraction is exerted over a relatively small surface contact area, hence increasing sealing pressure, and because there are, in effect, two seal areas rather than one. Consequently, if one seal is compromised by, for example, dirt deposits preventing a good seal, there is a good chance that the other seal will remain unaffected by the same problem and hence will still be effective.

The seal arrangement enabled by the invention has other advantages, in some cases unexpected. For example in conventional refrigeration, especially freezers, it is common practice to provide trace heating to the magnetic seal surface to prevent condensation and icing. The Applicant has tested its magnetic seal over the full range of storage and ambient conditions likely to be encountered in service. This testing has been in the context of the appliances disclosed in the Applicant's earlier patent applications WO 01/020237, WO 02/073104, WO 02/073105 and WO 02/073107, in which much of the exterior of the drawers and hence the outside of the drawer/lid interface may be exposed to air at or above ambient temperature. No problems have been experienced with icing, which would normally manifest itself as sticking seals; instead, the Applicant has found generally acceptable formation of condensation between the surfaces of the seal which remains largely in liquid form as moisture rather than ice. Significantly, it has been found that this moisture assists the purposes of the invention by acting as a lubricant to relative sliding movement, and in that the wiping action between moisture-bearing sliding surfaces helps to keep the seal surfaces clean. The invention therefore provides a self-lubricating and self-cleaning seal in which trace heating is not necessary.

Further, it has been explained above in relation to FIGS. 1(a) to 1(d) that the aggregate magnetic attraction between the lid seal 4 and the sealing surface 5 depends upon the degree of alignment of those sealing loops. In approximate terms, the aggregate force of attraction halves soon after the drawer has been opened because the front and rear sections of the respective sealing loops come out of mutual alignment. The Applicant has realised, somewhat counter-intuitively, that this characteristic can be enabled and exploited by designing a magnetic seal to have resilience that biases the magnetic element of that seal away from the opposing sealing surface. The seal may be further designed such that this resilience overcomes the weakened aggregate magnetic attraction when the sealing loops as a whole are misaligned but is itself overcome by the stronger aggregate magnetic attraction when the sealing loops as a whole are aligned. In this way, the area of contact between the seal parts can be reduced or eliminated when the drawer is not fully closed, especially where freedom of movement is required during opening and closing, and conversely can be maximised when the drawer is fully closed and hence sealing is required. In other words, with careful design, a seal can be arranged (i) to extend into full sealing contact with an opposed sealing surface when the drawer is fully closed and (ii) to retract into lesser sliding contact, or possibly even entirely out of contact, with the opposed sealing surface when the drawer is at other positions, for example when being opened or closed.

Many variations are possible within the inventive concept. Some variations will now be described with reference to FIGS. 4, 5 and 6.

Figure 4:
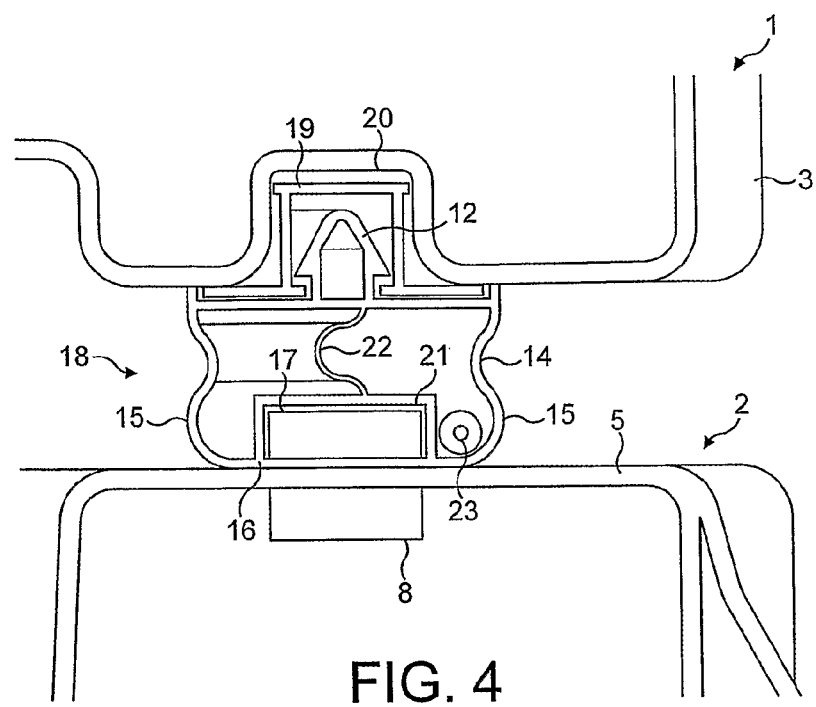
FIG. 4 is a cross-sectional view of an alternative seal arrangement whose seal is mounted inboard with respect to the lid and the drawer and incorporates the option of a trace heater.

In FIG. 4, for example, an alternative seal arrangement employs a different lid seal profile to that shown in FIGS. 2 and 3. However, there are similarities between the profiles making it appropriate to use common reference numerals for like parts.

Again, the seal 18 shown in FIG. 4 is a flexible resilient strip, suitably extruded or moulded, and is largely (though not totally) symmetrical about its central longitudinal plane. Looking from top down as illustrated, the seal 18 comprises an anchor portion 12 of arrowhead cross-section as before but in this case the anchor portion 12 is snap-fitted into a channel-section frame member 19 that supports the seal 18 as a readily-replaceable rigid rectangular assembly. The frame member 19, in turn, fits into a groove 20 in the bottom face of the skirt 3 depending from the lid 1, thereby to fit the frame/seal assembly to the lid 1.

Beneath the anchor portion 12, the seal 18 is of hollow cross section and comprises a waist portion 14, somewhat wider than that of FIGS. 2 and 3, extending inwardly above a flared base portion. As before, the base portion has rounded lobes 15 that curve outwardly and downwardly from the waist portion 14 and then inwardly towards each other to support a central generally flat web 16. The web 16, in turn, covers a magnetic strip 17 concealed within an integral channel 21 such that when the drawer 2 is closed, the magnetic strip 17 attracts an opposed magnetic strip 8 under the upper sealing surface 5 of the drawer 2. Although not apparent in FIG. 4, where the web 16 of the seal 18 is shown pulled downwardly by magnetic attraction when the drawer 2 is closed, the lobes 15 may curve slightly upwardly as they curve inwardly, as in FIGS. 2 and 3. So when the drawer 2 is open and magnetic attraction has been interrupted, the web 16 may be slightly above the lowest level of the lobes 15.

Internally, the profile of the seal 18 further includes a resilient web 22 of sinuous cross-section extending between the anchor portion 12 and the channel 21. The web 22 resists distortion of the seal 18 and helps to stabilise the magnetic strip 17 within the channel 21.

A further internal feature of the seal 18 is a trace heater comprising an insulated resistive wire 23 concealed within the profile beside the channel 21, inside the lobe 15 to the outboard side of the seal 18. In use of the appliance, the wire 23 heats continuously at low voltage and low power (typically 4 to 5 watts per linear metre of seal) to discourage condensation on the exposed outside surface of the seal 18.

Condensation can be a problem where, as shown in FIG. 4, a seal 18 is an appreciable distance inboard from the outer edges of the lid 1 and drawer 2. This location restricts ambient airflow to the outside of the seal 18, allowing a boundary air layer to form over the exposed seal surface. The boundary layer may allow that surface to cool below dew point whereupon condensation forms and floods the seal mating area, where it freezes to ice and may jam the drawer shut.

Inboard seal location may, for example, follow from fitting a rectangular frame/seal assembly to a lid 1 where the lid 1 and the drawer 2 have plain curved corners in plan. Inboard location is necessary in that event because otherwise the corners of the frame/seal assembly would overhang the curved corners of the lid 1 and drawer 2.

Trace heating of seals is well known in the cold-storage art but this typically involves high-duty 'mullion heaters', operating at say 30 to 40 watts per metre. Moreover, such heaters are typically built into the cabinet of a cold-storage appliance, for example by being embedded in insulating foam around a door or lid opening, and so can never be replaced. This is in contrast to the arrangement shown in FIG. 4 where trace heating is applied directly to the seal 18 and indeed directly to the most vulnerable part of the seal 18, hence enabling low energy consumption. Moreover, the trace heater in FIG. 4 is readily replaceable as a unit with the seal 18 and frame member 19, in a matter of minutes.

Figure 5:
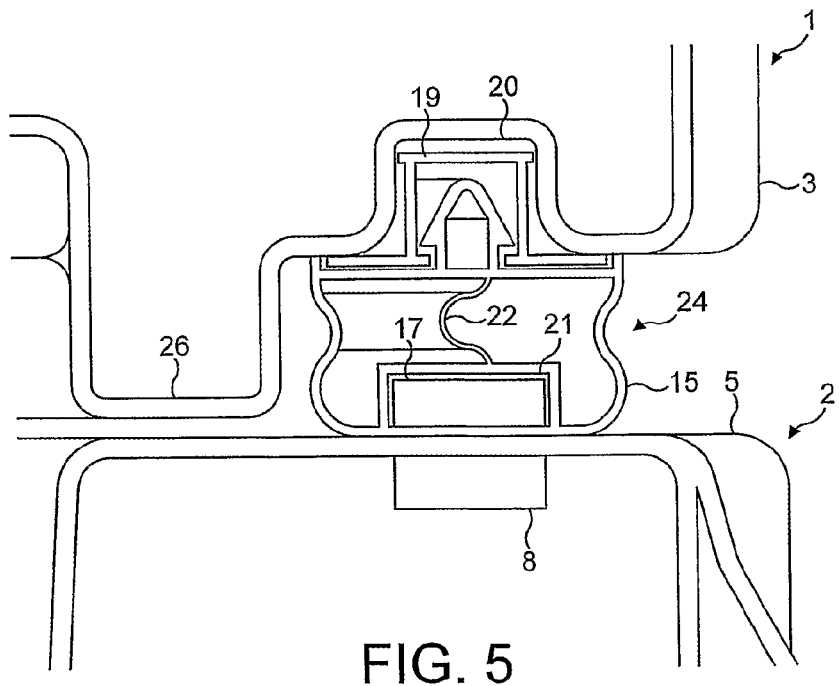
FIG. 5 is a cross-sectional view of a further alternative seal arrangement whose seal is mounted outboard with respect to the lid and the drawer, showing the seal profile of FIG. 4 but without a trace heater, supplemented by an insulating flange projecting downwardly from the lid inboard of the seal.
Figure 6:
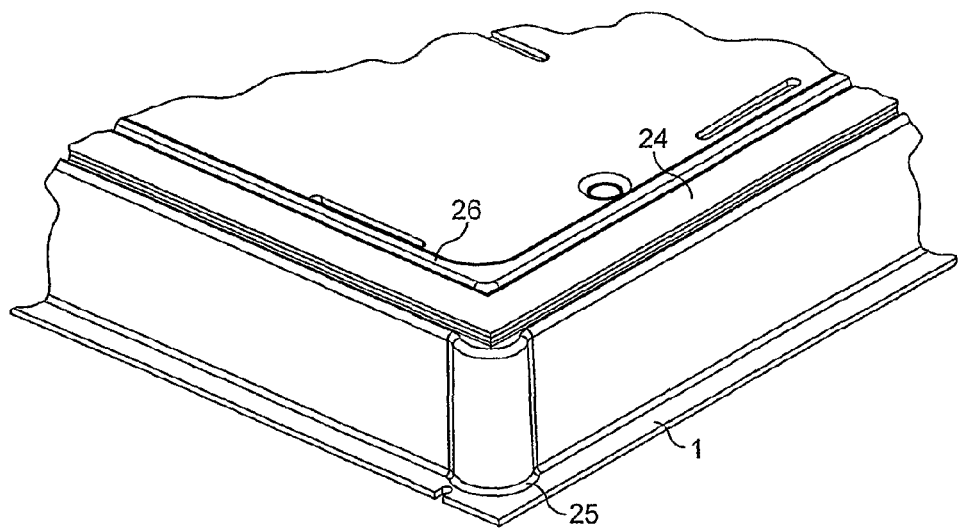
FIG. 6 is an inverted perspective view of the lid of FIG. 5 showing the seal mounted in an outboard position with respect to the insulating flange that depends from the lid, and also showing bulbous corners that accommodate the outboard location of the seal.

Moving on now to FIGS. 5 and 6, these drawings show an embodiment where a seal 24 is located in an advantageous outboard position where it is better exposed to ambient air flow to keep its surface temperature above dew point. Consequently, although the seal profile is the same as that illustrated in FIG. 4, the trace heater wire 23 of FIG. 4 has been omitted although it could be retained if needs be.

Whilst the seal 24 is deliberately exposed to ambient air flow in this embodiment, it will be noted that a vapour barrier is formed at the outermost edge of the seal profile to prevent moisture bypassing the seal 24 and so to discourage the formation of condensation or ice under or around the seal 24.

As the perspective view of the inverted lid 1 in FIG. 6 shows, the rectangular seal 24 is accommodated in an outboard position by virtue of bulbous curved corners 25 of the lid 1. A further alteration is evident in FIG. 6 and particularly in the sectional view of FIG. 5, namely an insulating flange or skirt 26 inboard of the seal 24. This helps to shield the seal 24 from low temperatures within the drawer 2. The principle is based upon a temperature gradient from say—20 Celsius within the drawer 2, immediately inboard of the flange or skirt 26, through to ambient temperature immediately outboard of the seal 24. The position, thickness and conductivity of the various rim interface elements arrayed across that temperature gradient will determine the outward extent of a sub-zero region in which the temperature is below zero Celsius and hence freezing is a risk. The design objective is to ensure that the sub-zero region extends no further than the insulating flange or skirt 26 so that the seal profile is always above freezing and so is immune to ice formation.

Many other variations are possible within the inventive concept. For example, the convenience of electrical elements such as resistance wire is preferred for trace heating but the trace heater could instead be a duct for hot fluid such as refrigerant flowing from an evaporator in the appliance.

The improved magnetic seal arrangements of the invention have many benefits that have been outlined above. They also facilitate and enable other benefits, particularly in the configuration of storage apparatus such as cold-storage appliances. For example, FIG. 7 of the drawings shows a cold-storage appliance 27 in which drawers 28 are movable with respect to a supporting structure to be opened and closed, and can open in more than one direction with respect to that structure. A similar arrangement is also suggested in the Applicant's abovementioned prior patent application published as WO 01/020237. In this way, workers stationed on both sides of the appliance 27 may access its contents, for example workers at 'back of house' and 'front of house' in a restaurant where the appliance 27 divides a kitchen into a public area and a private area. It may also be that workers involved in food preparation stand on opposite sides of a worktop situated above or defined by the top of the appliance 27. In such circumstances, workers standing on both sides of the appliance 27 can access the drawer contents with equal convenience.

Figure 7:
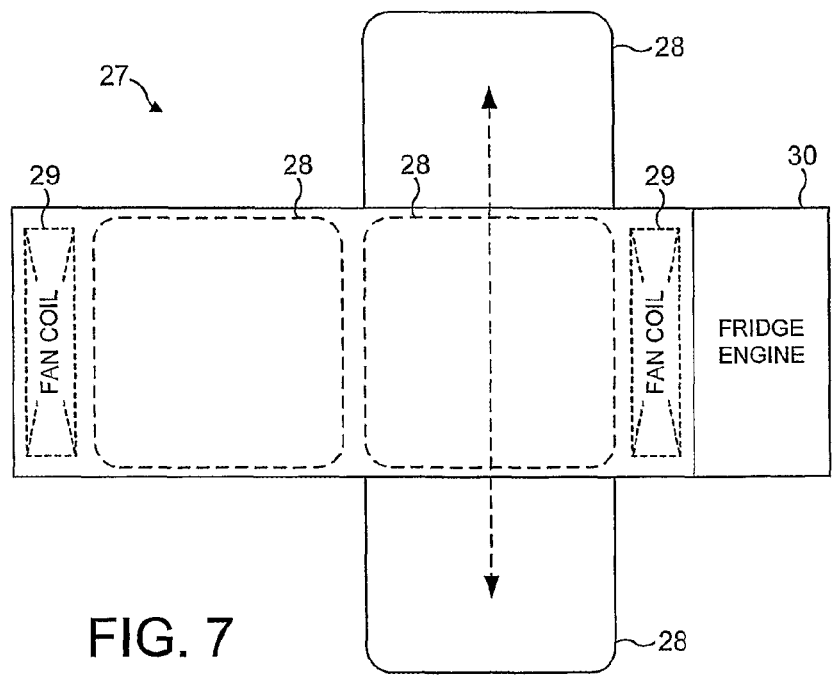
FIG. 7 is a plan view of a cold-storage appliance in which drawers are movable with respect to a supporting structure to be opened and closed, and can open in more than one direction with respect to that structure.

In the appliance 27 shown in FIG. 7, two refrigerated drawers 28 are disposed side-by-side in an under-counter or servery unit. The number of drawers is not important: there could be only one drawer or more than two drawers, disposed beside each other or stacked one above another. Fan coil units 29 supply cold air to the drawers via fixed lids (not shown) that seal to the drawers 28 when the drawers 28 are slid into the structure of the appliance 27 upon closing. The fan coil units 29, traditionally rear-mounted, are positioned to the side of the drawers 28 in this instance to allow the drawers 28 to slide open forwardly or rearwardly with respect to the structure. A common refrigerator engine 30, also side-mounted, pumps refrigerant in a circuit that includes branches for the fan coil units 29.

Whilst one fan coil unit 29 is shown for each drawer 28, it would also be possible (albeit less beneficial in terms of temperature control) to cool both drawers 28 with a single fan coil unit 29 or other refrigerator means. It would also be possible, but less advantageous in terms of space utilisation, to mount the fan coil units 29 and refrigerator engine 30 above or below the drawers 28.

Figure 10:
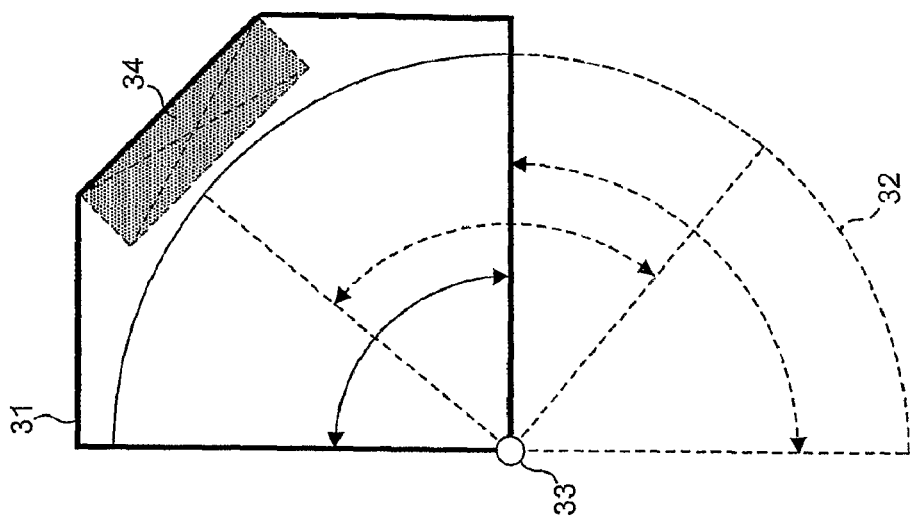
FIG. 10 is a plan view corresponding to FIG. 9 and showing the extent of movement of the drawer during partial and full opening.
Figure 9:
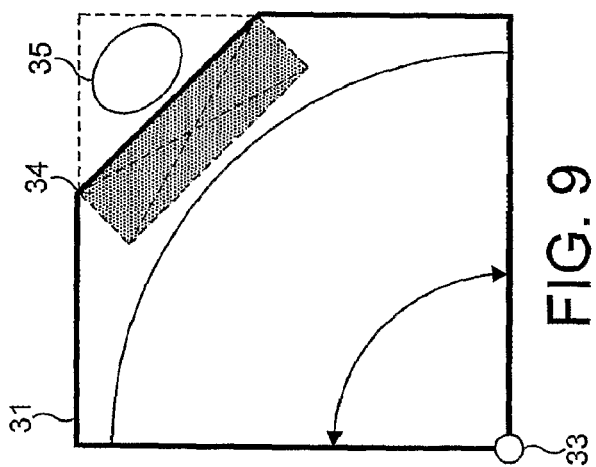
FIG. 9 is a plan view corresponding to FIG. 8 but showing how space not occupied by the drawer may be exploited.
Figure 8:
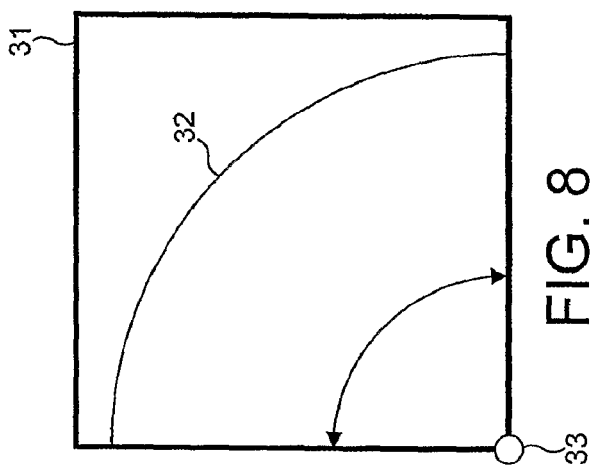
FIG. 8 is a plan view of a kitchen cabinet from which a drawer can be pivoted about a vertical axis for opening.

FIGS. 8 to 10 show how the invention may be integrated in a novel manner into furniture such as a kitchen cabinet. Here, the typical square plan outline of a cabinet 31 contains a quadrant-shaped insulated drawer 32, the radii of the quadrant corresponding to perpendicular walls of the cabinet 31 but being a little shorter than the internal diameter of the cabinet 31, so as to give clearance for movement of the drawer 32 with respect to the cabinet 31.

The radii converge to a pivot axis 33 at a corner of the cabinet 31 whereby the drawer 32 can be swung around that vertical axis in and out of the cabinet 31 to close and open the drawer 32, as shown in dotted lines in FIG. 10. A lid (not shown) seals to the top of the drawer 32 when the drawer 32 is closed fully within the cabinet 31.

It will be apparent from FIG. 8 that a substantial volume within the cabinet 31 (toward the upper right corner as illustrated) is redundant for cold-storage as such, as it is not necessary to accommodate the pivoting drawer 32. However, in preferred embodiments of the invention, this space is used advantageously by siting ancillary equipment there such as fan coil and/or refrigerator engine units as shown in FIGS. 9 and 10. In FIG. 9, for example, the upper right corner of the cabinet 31 is cut away and an elongate fan coil unit 34 is inclined with respect to the adjacent walls of the cabinet 31, in this instance at 45° to make optimum use of the available space outside the quadrant drawer 32. When the cabinet 31 is built adjacent to a wall or against other cabinets, this cutaway arrangement leaves a further space outside the fan coil unit 34 which may be used for various purposes, for example for service distribution or for a refrigerator engine 35 serving one or more cold-storage drawers 32.

The cabinet 31 shown in FIGS. 8 to 10 is apt to be used with other similar cabinets in composite arrangements, some of which are shown in FIGS. 11 to 16. Upon reviewing FIGS. 11 to 16, it will be apparent that identical cabinets 31 can be oriented in different ways to achieve different objectives. This is a further benefit of the cabinet design shown in FIGS. 8 to 10.

Figure 11:
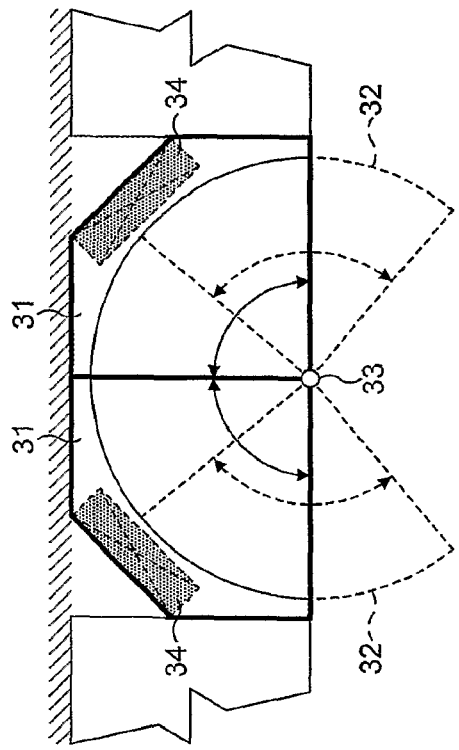
FIGS. 11, 12 and 13 are plan views that show different ways in which cabinets of FIGS. 8, 9 and 10 above can be paired.
Figure 12:
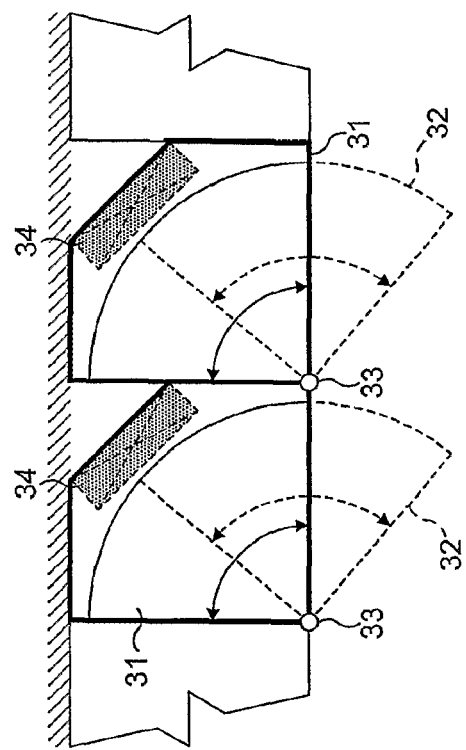
Figure 13:
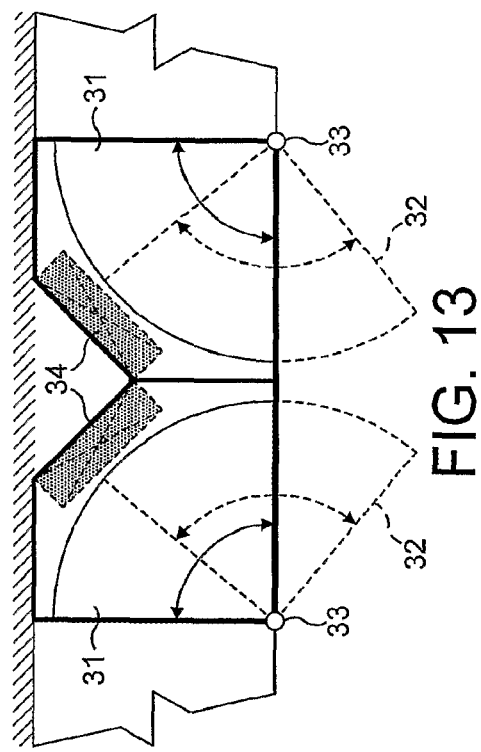

Looking firstly at FIGS. 11, 12 and 13, these show various ways in which cabinets 31 can be paired side-by-side. In FIG. 11, for example, cabinets 31 are placed in the same orientation. In FIG. 12, cabinets 31 are oriented 90° apart with their cut-away corners facing away from one another. An interesting and potentially useful consequence is that the paired cabinets 31 can share a common pivot axis 33 and so can be swung independently as quadrants or together as a semicircular whole. FIG. 13, on the other hand, also shows cabinets 31 oriented 90° apart but in this instance with their cut-away corners adjoining to define an enlarged space behind and between the cabinets 31. The enlarged space is apt to accommodate one or more fan coil units 34 and/or refrigerator engine units 35 which may, if desired, be shared between the cabinets 31.

Figure 15:
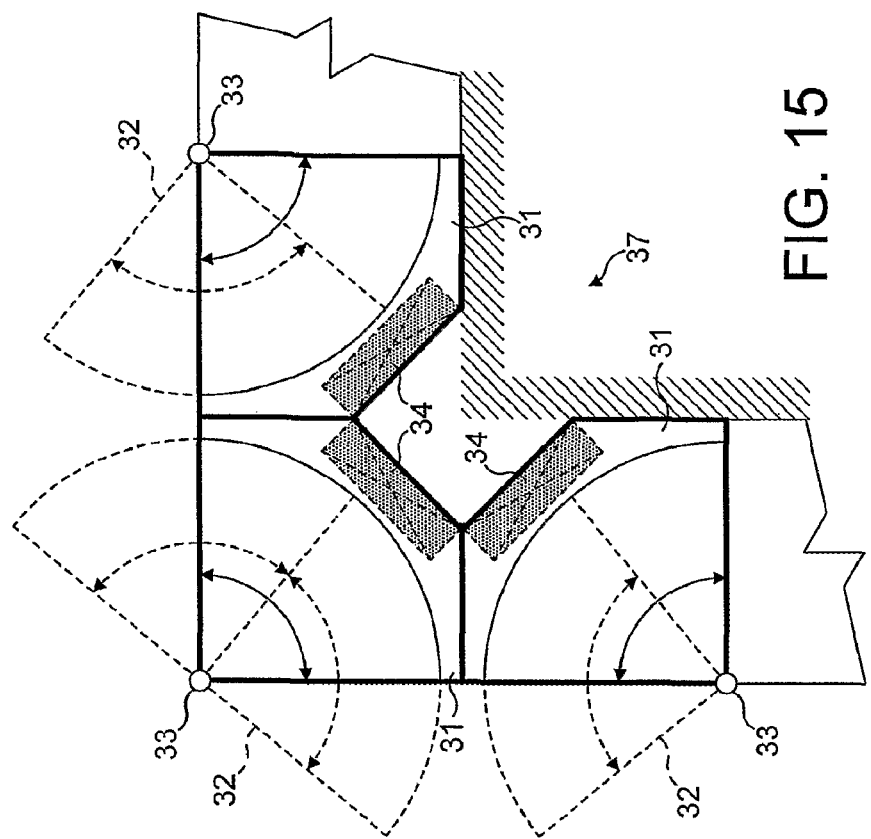
FIGS. 14 and 15 are plan views showing different ways in which three cabinets of FIGS. 8, 9 and 10 above can be arranged in an L-shaped array.
Figure 14:
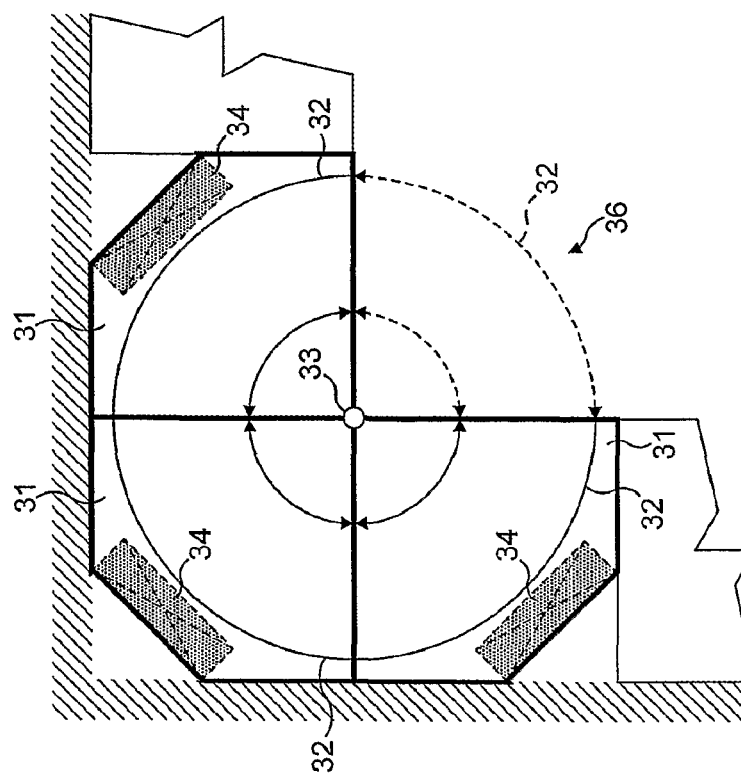

FIGS. 14 and 15 show ways in which three cabinets 31 can be arranged in an L-shaped corner array. FIG. 14 shows an inside corner arrangement 36 in which diagonally opposed end cabinets 31, oriented at 180° to each other, adjoin a central cabinet 31 oriented at 90° to each of the end cabinets. In essence, the arrangement of FIG. 14 adds a third cabinet to the two cabinets of FIG. 12, sharing the same pivot axis 33. So, all three cabinets 31 share a central pivot axis 33 about which their drawers 32 can pivot either individually (subject to clearance from adjacent drawers) or together.

FIG. 15 shows an outside corner arrangement 37 that adds a third cabinet to the two cabinets of FIG. 13, with the cut-away corner of the additional cabinet 31 adjoining the cut-away corners of those two cabinets to create an even larger space for ancillary equipment such as fan coil units 34 or refrigerator engine units 35. Again, diagonally opposed end cabinets 31, oriented 180° to each other, adjoin a central cabinet 31 oriented at 90° to each of the end cabinets 31. However, all of the cabinets 31 of FIG. 15 are turned through 180° with respect to the cabinets 31 of FIG. 14.

Figure 16:
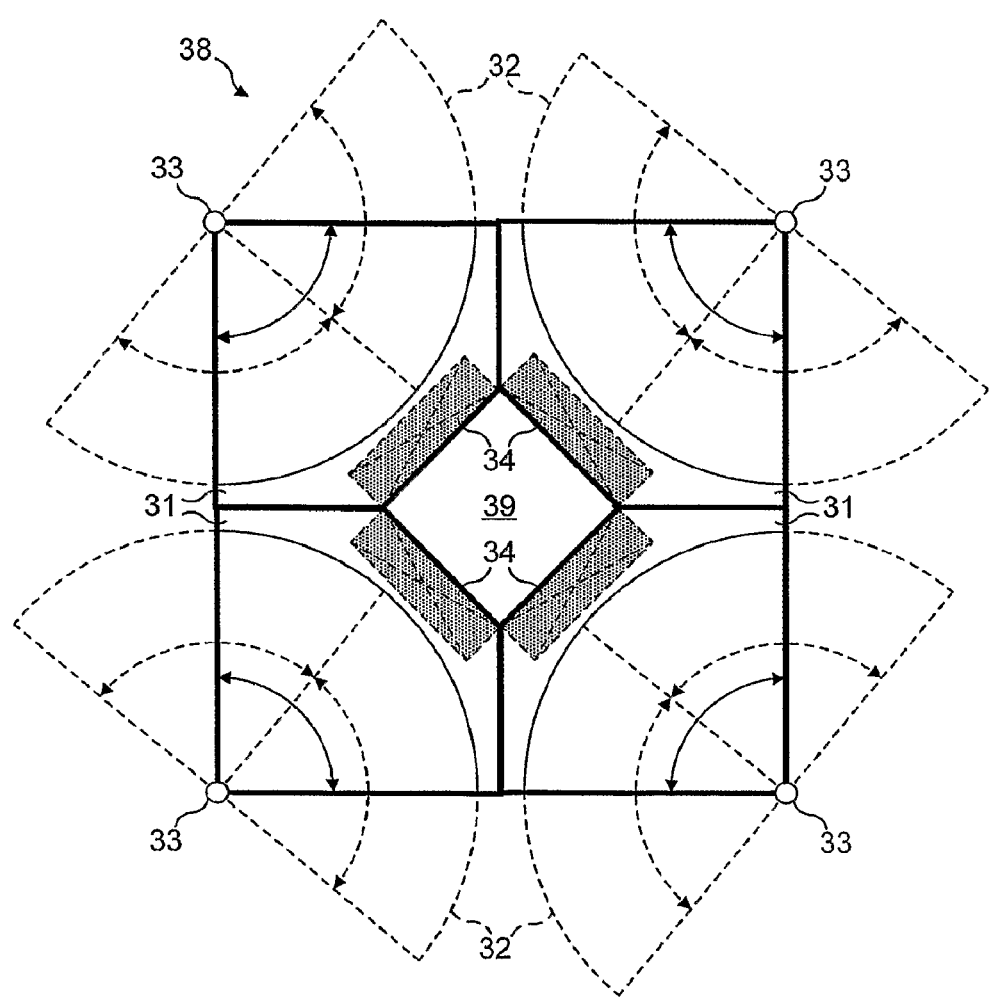
FIG. 16 is a plan view showing how four cabinets of FIGS. 8, 9 and 10 above can be arranged in a square array.

FIG. 16 shows how four cabinets 31 can be arranged in a square 'island' format 38 with each cabinet 31 at 90° to its neighbours and with the cut-outs of the cabinets 31 adjoining to create a large square central void 39. That void 39 is apt to be used for a sink, for a cooker, for waste disposal or drainage, for ventilation or for other services. It may also receive a structural member such as a column (not shown) around which the island 38 may be assembled.

Figure 17:
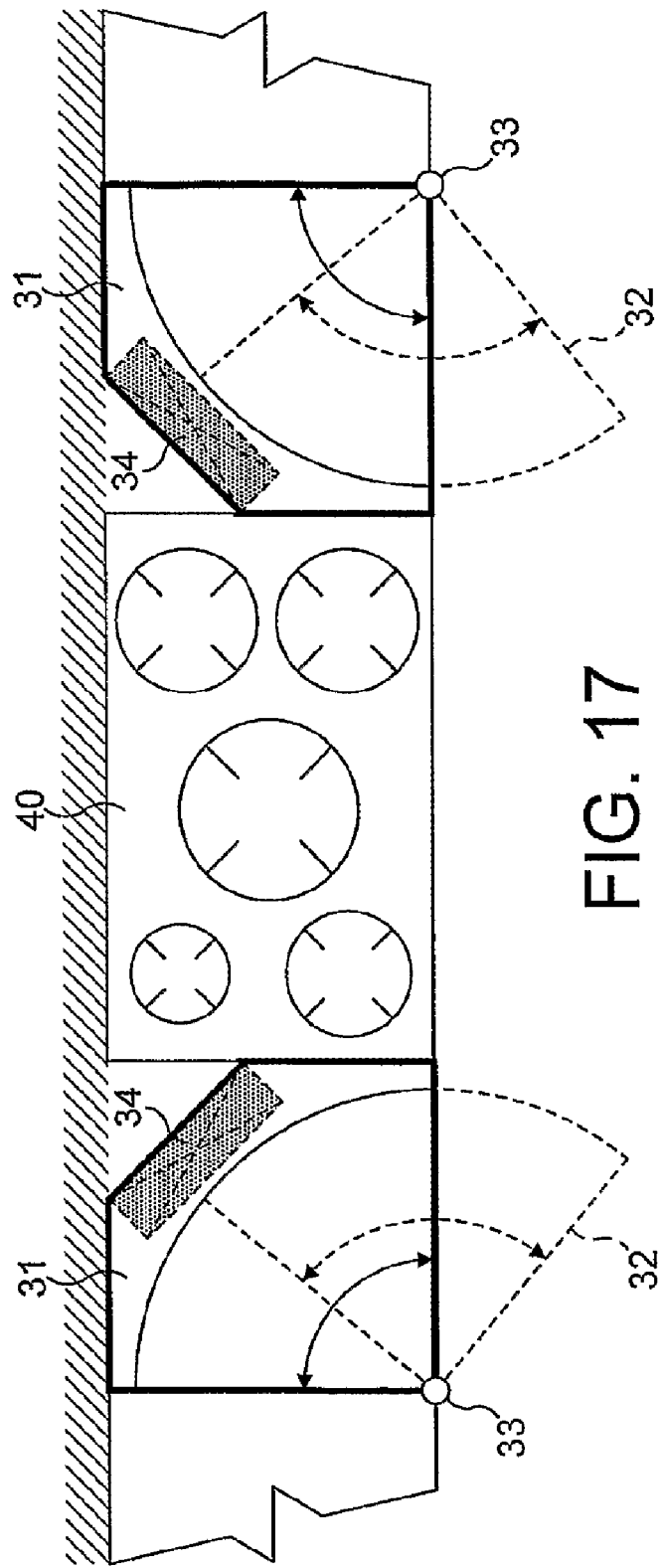
FIG. 17 is a plan view showing how cabinets of FIGS. 8, 9 and 10 above can be used with another kitchen appliance exemplified by a hob or cooker.

Finally, FIG. 17 shows cabinets 31 on both sides of another kitchen appliance, in this case exemplified by a hob or cooker 40. Whilst shown built in to a continuous run of kitchen units, it will be apparent that the cabinets 31 of FIG. 17 could be open to the sides; in that case, the drawer 32 can open to both the front and to the side as desired, by virtue of the outboard positioning of the pivot axis 33 as shown.

What is claimed is:

1. A storage compartment comprising a container defining an access aperture closable by a closure that can be sealed to the container around the aperture and that can be opened by relative movement between the container and the closure in a lateral direction with respect to the aperture, the container having a first sealing loop around the aperture and the closure having a second sealing loop co-operable by alignment with the first sealing loop to maintain a seal when the closure closes the aperture, the sealing loops being moved into and out of mutual alignment by said relative movement between the container and the closure and comprising sections transverse to the direction of movement and sections aligned with the direction of movement wherein:
   at least one of the sealing loops comprises a resiliently flexible seal that houses a magnetic or magnetically attractive strip extending along the sealing loop for attraction to the other sealing loop; and
   mutual alignment of the sealing loops effects a seal in use by increasing aggregate magnetic attraction between the sealing loops to overcome said bias of the resiliently flexible material.

2. The compartment of claim 1, wherein the relative movement between the container and the closure causes sliding contact between the sealing loops.

3. The compartment of claim 1, wherein the sealing loops are substantially planar.

4. The compartment of claim 3, wherein a minor portion of a sealing loop is out of the plane of the remainder of the loop.

5. The compartment of claim 3, wherein the sealing loops move in substantially parallel planes.

6. The compartment of claim 3, wherein the sealing loops are substantially coplanar.

7. The compartment of, claim 1 wherein the sections are substantially straight.

8. The compartment of claim 7, wherein the sealing loops are generally rectangular and define front and rear sections and two side sections connected successively by corners.

9. The compartment of claim 1, wherein the sealing loops are continuous.

10. The compartment of claim 1, wherein both sealing loops include magnetic means.

11. The compartment of claim 1, wherein one of the sealing loops includes magnetic means and the other of the sealing loops includes material that can be attracted to the magnetic means.

12. The compartment of claim 1, wherein the seal is an elongate member defining generally parallel ridges separated by a web wherein the ridges maintain clearance between the web and a cooperating sealing surface in use.

13. The compartment of claim 12, wherein said magnetic or magnetically attractive strip extends along the web to press the ridges into sealing contact with the cooperating sealing surface in use.

14. The compartment of claim 13, wherein alignment of the sealing loops increases magnetic attraction to overcome the bias of said seal in use.

15. The compartment of claim 1, further comprising a trace heater associated with at least one of the sealing loops.

16. The compartment of claim 15, wherein the trace heater applies heat directly to the seal.

17. The compartment of claim 15, wherein the trace heater is within the seal.

18. The compartment of claim 16, wherein the trace heater applies heat to an outboard side of the seal.

19. The compartment of claim 1, wherein at least one of the sealing loops is mounted to a removable relatively rigid frame that can be fixed to the container or to the closure.

20. The compartment of claim 1, further comprising an insulating barrier inboard of at least one of the sealing loops.

21. The compartment of claim 20, wherein the insulating barrier is configured to maintain substantially all of the associated sealing loop above zero Celsius when the container is used for frozen storage.

22. The compartment of claim 1, wherein the sealing loops are substantially rectangular and wherein at least one of the container and the closure are substantially rectangular and have rounded bulbous corners.

* * * * *